May 10, 1955     A. B. SOWTER     2,707,889
PRESSURE WELDING

Filed May 1, 1951     3 Sheets-Sheet 1

INVENTOR
ANTHONY BAGNOLD SOWTER
BY
ATTORNEY

May 10, 1955   A. B. SOWTER   2,707,889
PRESSURE WELDING

Filed May 1, 1951   3 Sheets-Sheet 2

INVENTOR
ANTHONY BAGNOLD SOWTER

BY

ATTORNEY

May 10, 1955     A. B. SOWTER     2,707,889
PRESSURE WELDING
Filed May 1, 1951                                                 3 Sheets-Sheet 3
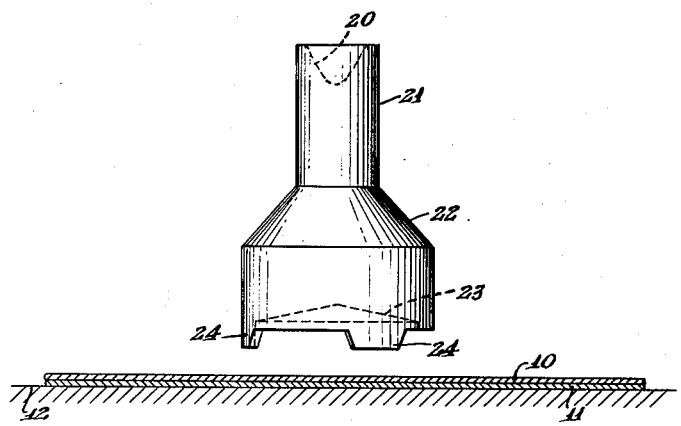
FIG.11.
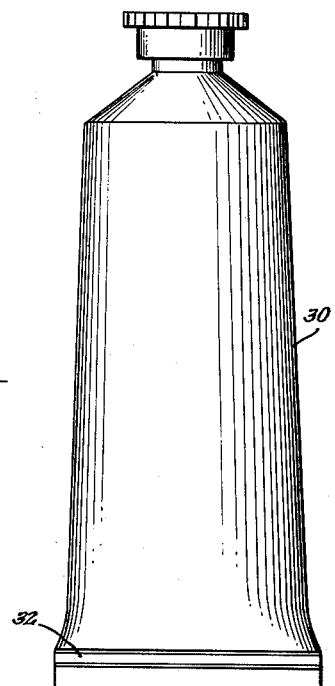
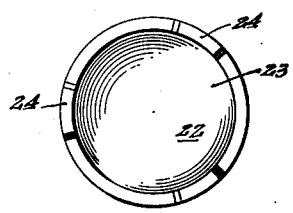
FIG.12.
FIG.14.
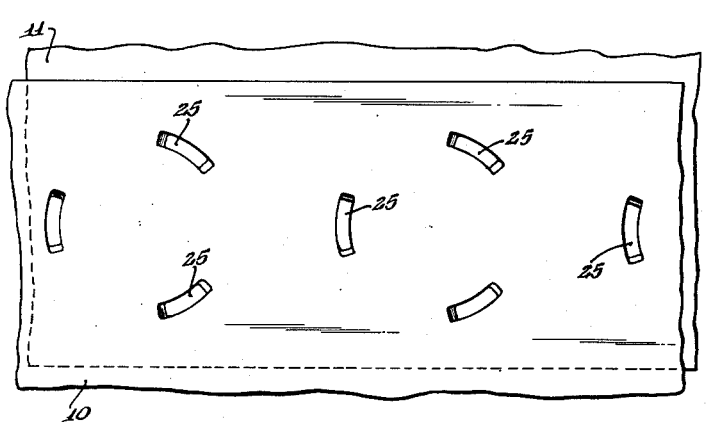
FIG.13
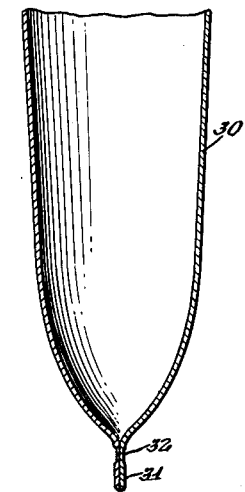
FIG.15.
INVENTOR
ANTHONY BAGNOLD SOWTER
BY
ATTORNEY

United States Patent Office 2,707,889
Patented May 10, 1955

2,707,889

PRESSURE WELDING

Anthony Bagnold Sowter, Wembley, England, assignor to The General Electric Company Limited, London, England Application May 1, 1951, Serial No. 223,841

Claims priority, application Great Britain October 20, 1950

2 Claims. (Cl. 29—470.1)

The present invention relates to pressure welding, such as cold pressure welding, that is the welding together of a pair of metallic members of aluminum, copper, or other ductile non-ferrous metal or metal alloy, essentially by pressure applied to the members to be welded.

As is well known, in cold pressure welding, with substantially no external heat being applied to the members to be welded, a suitable design of the pressure welding tools and proper control of the tool pressure, after cleaning of the areas of contact to be joined to eliminate any matter foreign to the metal, results in a cold or plastic flow of the metals of the adjoining surfaces into intimate contact, to form a solid phase welded bond therebetween.

The invention is, however, not restricted to cold pressure welding and may be applied to pressure welding with some heat being supplied to the members to be welded, where welding is, however, effected essentially as a result of the pressure-induced plastic flow of the metal of the adjoining surfaces to cause a merging or bonding into a solid phase weld. This additional heat may be supplied to the members by heating the pressure welding tools, or the members may be pre-heated in any suitable manner before insertion between the welding tools.

There has already been proposed, for example in the specification of United States Patent No. 2,522,408 in the name of the present applicant, a method of and means for welding together a pair of metallic members by a cold welded lap joint, such as plates, sheets, flanges or the like of aluminum, copper or other non-ferrous and ductile metal or metal alloys capable of being pressure welded.

More specifically, said patent discloses various methods and tools for producing indentation welds, either in the form of a continuous line weld or a spot weld at one or more limited island-like areas of the contacting surfaces of the members to be welded.

Since, in cold pressure welding, metal must flow laterally of the area subjected to pressure by the welding tools, to cause a cold or plastic flow and to effect a merging or intimate bonding of the metal of the contacting surfaces to be joined, the most efficient tool shape or pressure area has been found to be of a strip-like or rectangular shape, with the width of the strip or rectangle being approximately of the order of or somewhat exceeding the thickness of the members being welded, but being practically not more than about twice said thickness, and with the length of the rectangle, in case of a spot weld, being at least five times the width thereof. This shape of the welded area, in addition to requiring a minimum indentation or tool penetration at the area being welded, being about 60% of the total thickness of the members being welded for aluminum, insures a favorable and unimpeded flow of the metal laterally of the contacting surfaces, whereby to enable the attainment of an intimate welded bond of maximum strength with a minimum of applied pressure and resultant distortion suffered by the metal at and in the neighborhood of the weld.

As the thickness of the members to be welded decreases, the necessarily reduced dimensions of the pressure tools makes it increasingly difficult to control the tool penetration with sufficient accuracy. As a result, in using conventional pressure welding techniques as described in the abovementioned patent, a practical limit is soon reached for members of greatly reduced thickness to be welded, such as thin sheets or metal foil, where any effective and reliable welding will be practically impossible, both on account of the minute size of the welding tools and the difficulty of control of tool penetration.

Accordingly, an object of the present invention is the provision of a novel method of and means for welding relatively thin members, such as metal foil, efficiently and free from the difficulties and drawbacks inherent in previous welding techniques.

Other objects of the invention are the provision of a method of pressure welding members of ductile metal, such as metal foil or sheet, which is relatively simple and easy to control; which results in a joint of increased area and strength compared with welded joints obtainable in accordance with previous welding processes; and which can be practiced by means of simple tools and without requiring special skill.

Further objects as well as novel features and advantages of the invention will be better understood from the following detailed description considered in conjunction with the accompanying drawings, forming part of this specification and wherein:

Figure 11 shows a modified welding tool construction specially suitable for cold pressure welding a pair of thin superposed sheets or foil according to the invention;

Figure 12 is a bottom view of the tool shown in Figure 10;

Figure 13 is a top view of the sheets after welding by means of a tool shown in Figures 10 and 11;

Figure 14 is a side view of a collapsible tube having a bottom connected by pressure welding according to the invention; and Figure 15 is a section taken on line 14—14 of Figure 13.

Like reference characters identify like parts in the different views of the drawings.

Figure 1:
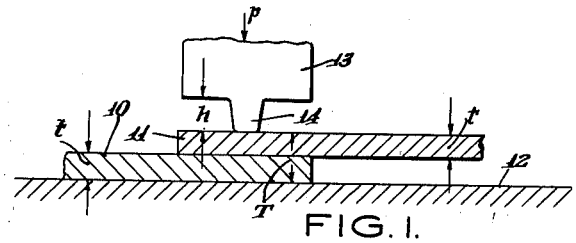
Figure 1 illustrates schematically a tool assembly and a pair of superposed metallic members, shown prior to welding, in accordance with previously known pressure welding processes.

Referring more particularly to Figure 1, there is shown a known arrangement for effecting an indentation pressure weld joining a first plate 10 with a second plate 11 placed upon the former in the manner of a lap weld and inserted between a pair of welding tools. The latter, in the example shown, consist of a lower tool or flat anvil 12 and an upper or top tool 13 having a flat surface and projecting therefrom a substantially flat-faced slightly tapering welding tip or tongue 14, as described in greater detail in the abovementioned patent.

By applying pressure to the superposed plates or sheets 10 and 11 as indicated by the arrow p, the metal underneath the tip 14 is caused to flow substantially laterally due to the relatively large total thickness or distance T of the members 10 and 11 compared with the width of the pressed area which is about equal to or of the order of the gauge thickness t of said members. As a result, upon effecting a sufficient indentation or tool penetration 14', Figure 3, the metal flow at the adjoining surfaces will result in a merging of the metals into intimate contact, whereby to effect a welding of the surfaces into a solid phase bond.

Figures 2, 3:
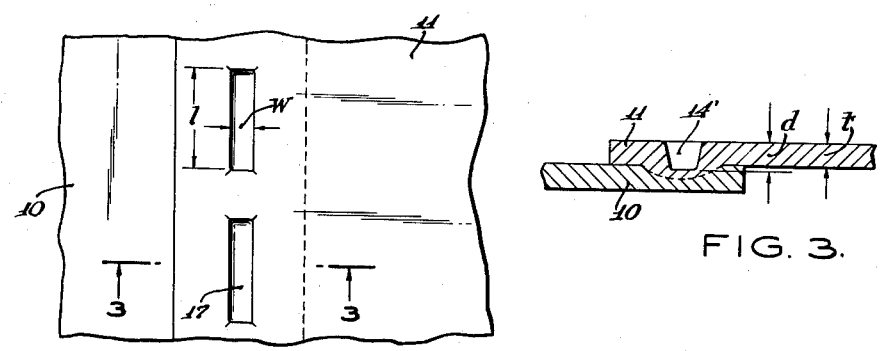
Figure 2 is a plan view of and Figure 3 is a cross-section through a completed welded joint, obtained by means of a tool according to Figure 1.

In order to insure optimum conditions, that is a maximum mechanical strength of the joint obtained with a minimum of distortion or indentation 14' at the weld, theoretical considerations and practical tests have shown that the width w, Figure 2, of the island-like or rectangular weld spot should be about 1.5 times the gauge thickness t of the members being welded and the length of the welded spot or area should be at least five times or more of the width thereof. In this manner, a substantial pressure will be exerted at right angles to the long sides of the rectangular area, resulting in a favorable and unimpeded metal flow and merging of the metals into a solid phase weld of optimum strength and resulting in a minimum distortion of the members being welded.

In place of a single-sided weld as shown, a double-sided weld may be made by replacing the anvil 12 by a lower tool similar to the tool 13, whereby to result in opposite depressions or weld indentations on both the members 10 and 11. In this case, the optimum width w of the welding area is about equal to the gauge thickness t, the total reduction d in thickness being the same as in the preceding example, in order to produce a weld joint of greatest strength and with a minimum of distortion of the metal at and near the weld. If greater distortion is permissible, the width w of the weld may be increased up to twice the gauge thickness t.

To achieve the above results, the required depth of indentation or tool penetration d was found to be at least about 60% of the total thickness T for metals of relatively high ductility such as aluminum, this minimum indentation increasing as the ductility decreases for different grades of aluminum or other cold weldable metals, as shown by the table of "figure of merits" given in the abovementioned patent. As a result, the maximum thickness of the metal at the weld is about 40% of the total thickness T of the members being welded. The indentation 14' or tool penetration d may be controlled either by means of a stop or abutment associated with the press embodying the tools 12 and 13 or by the height h of the tip 14 with the shoulder or flat surface of the tool 13 acting as an abutment or limit for the penetration of the tool, in a manner readily understood.

In pressure welding of the foregoing type, as the thickness of the members 10 and 11 is decreased, according to the general rule the width of the tip 14 will decrease accordingly, thus resulting not only in a weld of decreased strength but making it difficult, if not practically impossible, to control the depth of indentation at the welding area in a satisfactory and reliable manner. Thus, in the case of very thin metal foil, the pressure tip 14 approaches the dimensions of a knife edge and it will be evident that efficient pressure welding under such conditions is no longer possible. Practically, this condition prevails in case of metal sheets or foil having a thickness of less than about 0.030", such as used in collapsible metal tubes, envelopes or bags, or where the ends of two foil strips are to be connected in connection with any operating process.

According to one aspect of the present invention, there is provided a method of pressure welding relatively thin members, such as metal foil, by which the aforementioned difficulties are substantially overcome and efficient welded joints from both a mechanical and other standpoints are obtained.

Figure 4:
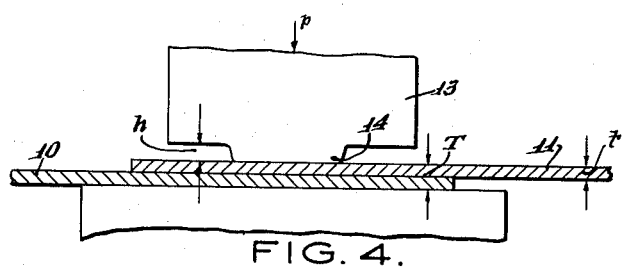
Figure 4 shows a tool arrangement and a pair of metal members, such as sheets, foils, etc., inserted therein prior to welding in accordance with the invention.
Figure 5:
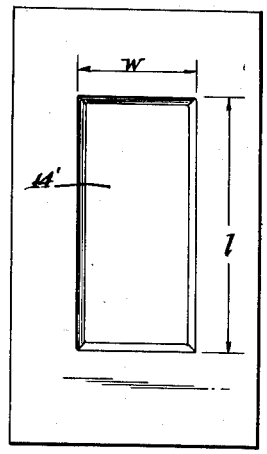
Figure 5 is an underneath view of the top welding tool of Figure 4.

Referring to Figures 4 and 5, there is shown an arrangement for producing a welded joint according to the invention. Items 10 and 11 again represent the superposed elements, such as metal foil pieces or sheets to be welded and consisting of aluminum or any other pressure weldable metal. Contrary to previous practice, the welding tool 13 is provided with a tip 14 having a width which is a substantial multiple, practically at least three or four times the gauge thickness t of the members 10 and 11 to be welded. The length l of the tip 14 or welded area is again a multiple of the width w thereof, but the minimum length may be somewhat less than in the case of Figures 1 to 3, practically about three times or more the width w of the rectangular area. In other words, the dimension of the weld area in any direction should be a substantial multiple of the gauge thickness, this being obtained for instance by a rectangular area as shown.

In an arrangement of this type, as the top tool 13 is brought down upon the superposed members 10 and 11 under pressure, as indicated by the arrow p, a substantial amount of metal will be displaced due to the relatively large pressure area compared with Figure 1. The amount of metal which flows causes the metal to flow up around the tool tip 14, in addition to the flow in the lateral direction, that is, there is a hobbing action as a result of the relatively small total thickness T of the members 10 and 11 compared with the width of the pressed area, in contrast to Figure 1 and as shown clearly in Figure 6.

Figure 6:
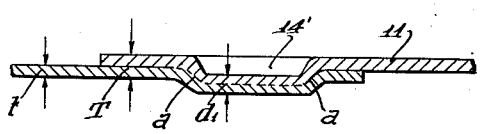
Figure 6 is a cross-section through the completed welded joint obtained by the process according to the invention.
Figure 7:
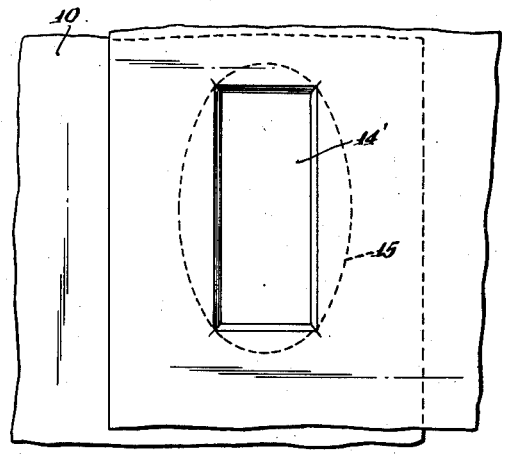
Figure 7 is a top view of the welded joint of Figure 6.

In other words, while in the case of Figure 1 with the tool width being of the order of or not substantially exceeding the gauge thickness t, metal flows substantially in a direction laterally to the contacting surfaces of the members, the metal adjacent to the pressed area in Figure 4, with the tool width being a substantial multiple or at least three or four times of the gauge thickness, is extended around the tool and there is a spreading of the weld to areas adjacent and outside the rectangular or pressed area, in such a manner as to forge the overlapping members 10 and 11 into a channel shape, as clearly shown in Figure 6. Actually, due to the fact that the metal being welded has the quality of strength, the load is distributed by the metal itself and the pattern on the underside against the tool 12 is not that of the tip 14 as it would be if the metal had no strength.

The thickness $d_1$ at the pressed area may be about 40% of the total thickness T for aluminum but in any case will be in accordance with the weldability of the material. Welding takes place over the entire rectangular welding area and the adjacent areas, as indicated at a in Figure 6, as a result of the flow of the metal, as described and shown in the drawings. However, in view of the spreading of the weld beyond the actual pressure area defined by the welding tool, the final thickness $d_1$ may have greater values and in the extreme equal to the total thickness T. In the latter case, the welded joint will be adjacent to or outside the rectangular or pressure area defined by the shape of the tool.

While the process described hereinabove is especially suitable for welding pieces of relatively small thickness, in particular metal foil, it may also be used for welding members, such as sheets or plates of relatively greater thickness, if the additional distortion caused by the extension of the metal around the tools is not objectionable. Thus, the members 10 and 11 may be a pair of bus bars in an electrical device, in which case the increased welding area has the further advantage of substantially reducing the electrical resistance of the welded joint.

The areas of contact of the members 10 and 11 to be joined are properly cleaned, such as by mechanical scratch-brushing, to remove the oxide film and other matter foreign to the metal and to provide clean metallic surfaces contacting each other prior to welding. However, due to the relatively large pressure areas used in accordance with the invention, cleaning, as far as removal of the oxide film is concerned, may be dispensed with in certain cases, the film being broken up by the relatively high initial pressure and large flow of metal and welding of the surfaces being insured by the increased flow compared with previous welding methods.

As will be understood, the pressure is greatest at the long sides of the rectangle, being of greater effectiveness in the centre and gradually decreasing towards the edges, whereby to result in an elliptically-shaped flow pattern laterally of the rectangular pressure area, as shown by the shape of the projection 15. As a result, this type of weld gives a joint of substantially increased area compared with known spot welds as shown in Figures 1 to 3, where the welding area is substantially limited to the pressure area or island spot defined by the shape of the welding tool. This increase of both the welding area and metal thickness at the weld, results in a corresponding increase of the mechanical strength, as well as decreased electric resistance of a welded joint of this type.

Figure 8:
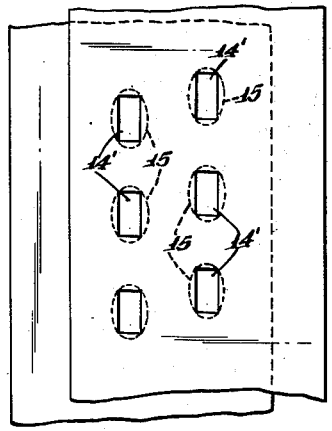
Figure 8 shows a multiple weld according to the invention.

While only a single spot weld has been shown in the drawing for illustration, it is understood that the foils may be connected by means of a plurality of welds arranged either in single or double rows and being preferably staggered, to obtain a joint of optimum mechanical and electrical characteristics. Such a multiple staggered weld is shown in Figure 8 and may be produced by means of a tool having a plurality of welding tips or by successive operations by means of a tool having a single welding tip.

Figure 9:
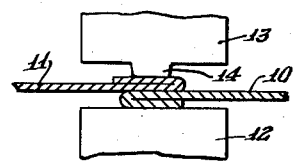
Figure 9 illustrates a feature of improvement for welding thin foil pieces in accordance with the invention.

In order to facilitate the welding of very thin foil, the latter may be doubled or folded over into two or more thicknesses as shown in Figure 9. In the latter case, the metal again flows at right angles to the foils, some hobbing action occurring, in the same manner as in the case of a single pair of foil pieces, and welding will be effected between all the adjacent metal surfaces. For good welds, it is necessary, as shown in Figure 9, to put the extra thickness of metal outside the actual parts 10 and 11 to be joined because the reduction in thickness of the layers reduces towards the center and the outer layers reinforce the inner layers which form the true joint by extending the weld zone outside the area of the welding face. The indentation or depression left by the welding tool may be the same as for a single pair of foils. In this case, the metal of the superposed foil elements is again caused to flow around the tool or tip 14, substantially in the same manner as in the case of a single pair of foils and in this respect conditions are substantially different from a pair of equivalent solid members or plates of the same total thickness. If desired, the foils may be bent or folded many times, to obtain a joint of desired strength and efficiency. In the case of a relatively large number of superposed foil thicknesses, it may be necessary to increase the indentation or tool depression, to insure efficient welding of all the adjacent and superposed metal surfaces.

In the case of a stacked foil weld of the latter type, extreme flow conditions take place at the tool corner due to the up flow of material similar as in welding with inserts, where a ring shaped tool is used and the inward radial displacement is permitted to flow up into the cavity in the center of the tool, as shown in co-pending patent application Serial No. 185,812, filed September 20, 1950, entitled Means for and Method of Securing Inserts in Ductile Metal Members by Pressure Welding, jointly filed by Henry J. Foxon and the present applicant.

Figure 10:
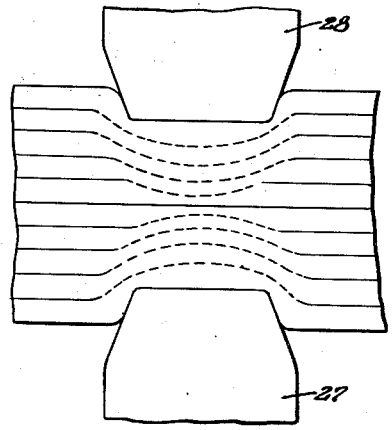
Figure 10 shows a stack of sheets or foils joined by cold pressure welding in accordance with the invention.

Thus, where ten thicknesses of material are joined by a double-sided weld by means of a pair of welding tools 27 and 28, as shown in Figure 10, the deformation is the same in the case of the top and bottom pieces, numbers one and ten, also two and nine, three and eight, four and seven, five and six. There is, however, a progressive variation in the way the deformation takes place between one and five. The layers which are nearest to the tool face maintain their central thickness while losing it rapidly at the points which are nearest to the tool corners. The more central layers tend to lose their center thickness.

In order to balance the welding effect through a number of material thicknesses, the corner radius of the tool or tools 27 and 28 must be maintained to avoid a punching action on the top and bottom pieces of the stack. To ensure welding between the center layers the tool face width must be greater than the total thickness of the stack.

In the drawing, the tool width is shown only about a half the total thickness of the stack, whereby welding, especially of the inner sheets may be incomplete. If welding of all the sheets or foils is desired, a tool width greater than or being a multiple of the total stack thickness should be employed.

It will be noticed that the welding effect is obtained between the outer layers first where the extreme flow conditions near the tool corners exist. The central layers weld in the usual way where the flow conditions in line with the center of the tool face make a weld possible. Intermediate layers adopt a compromise between these two welding conditions, as indicated by the dotted lines in the drawing.

Thin sheets or metal foils are advantageously pressure welded by means of an automatic center punch or similar impact tool, such as described in my co-pending patent application Serial No. 86,929, filed April 12, 1949, entitled Method and Apparatus for Cold Welding of Metal, now Patent No. 2,639,634 issued May 26, 1953, the punch co-operating with a flat anvil between which and the suitably shaped end of the punch the lap joint is trapped and a weld effected by the impact delivered by the automatic center punch. The punch may have a flat rectangular end whose length is several times its width which itself is a substantial multiple, i. e. at least three times the thickness or gauge of the foil. Providing the foil surfaces are uncontaminated with grease, etc., generally no scratch-brush cleaning is required.

When using an automatic center punch in this fashion for welding foils together, it is difficult, since the punch is manually operated, to keep it upright with the welding surface or end parallel to the surface of the anvil, with the result that the punch may be a little out of upright, so that there is a tendency for holes to be punched in the foils which holes tend to weaken the welds produced. Naturally, some guiding jig can be provided but this complication is to be avoided, particularly where say a welded joint is being made to repair a break in a length of foil passing through some foil processing machine and for many other uses.

The invention provides a simple means, whereby the difficulty regarding alignment of the welding tool is avoided. This object is achieved by making that part of the tool which engages the work self-aligning.

Thus, the tool may be three-legged so that it automatically engages the work correctly and each leg may effect a weld. An automatic center punch may be so modified that the spring-pressed rod thereof itself provides the three legs or projections for welding but preferably a separate welding tool which is self-aligning is used in conjunction with an automatic center punch or other impact device for providing a controlled blow to the tool.

Referring to Figures 11 to 13, one construction of such a tool suitable for welding overlapping sheets, such as aluminum foil of 0.0003" or greater thickness, in accordance with the invention will be described by way of example. The tool which is made of tool steel may be used with an ordinary automatic center punch the end of which is ground, to give a ball end which fits into a socket 20 in the haft 21 of the tool. The main body 22 of the tool is frusto-conical in shape and is provided with a conical recess 23 at its welding end. Around this recess 23 are provided three arc-shaped equidistantly spaced welding legs, tips or projections 24 whose free ends are flat, the radial widths of the ends being 0.03" and their chord lengths being 5/32". The diameter of the main body 22 across the welding tips is ½" and the tips project 1/16" from the main body. In order to ensure that no sharp metal edges are present on the tool to damage the foils being welded, all sharp corners of the welding tips 24 are honed away with a stone after hardening.

In welding two pieces of 0.0003" aluminum foil together by a lap weld, the overlapping foil ends 10 and 11 being uncontaminated by handling at least on those surfaces which are to be welded together, the lap joint is placed on a flat steel anvil 12, the tool as described put down on the lap joint with the tips resting on the top metal foil and then a controlled blow delivered by the automatic center punch which is placed in the socket 20. Because of the ball and socket connection, some misalignment of the punch and the tool is allowable but, naturally, every attempt should be made to keep the punch and tool as near in alignment as possible. When the blow is delivered, each tip effects a weld 25, Figure 13, and by moving the tool along the lap joint, a line of three point welds can be made at the joint, as shown in the drawing. The resultant lap welded joint is very strong, its strength approaching that of the foil itself.

While a single or spot weld has been shown and described herein, the welded joint may be in the form of a continuous line, either straight, curved or of any other shape, such as in the form of a wavy or zig-zag line or seam. This line may be interrupted to produce a plurality of spot welds in the manner shown of any desired pattern and to suit any existing requirements and conditions.

One effect which has been noted when tools having a width several times greater than the thickness of the material being welded are used, is that the meeting and welded surfaces between two layers of material or the welding interface are not flat as would be expected but are of undulating or wavy shape, the lines of the crests or troughs of the waves lying more or less parallel to the length of tool faces. This corrugation, as it were, of the weld itself does not necessarily produce a stronger weld but its cause undoubtedly helps to break up any remaining oxide film on the surfaces to be welded.

In some instances, this may aid the weld process so that scratch-brushing may be omitted and this has been found to be the case in the sealing of the ends of the collapsible tubes as shown in Figures 14 and 15, such as toothpaste tubes of lead or aluminum, since experiments have shown that satisfactory welds can be made without scratch-brushing and using tools of width equal to ten times the gauge of the material, a percentage reduction of about 60% being used. In the drawings, the tube 30 has its lower end 31 flattened and connected by a double-sided linear weld joint 32 produced by a tool having a width about 10 to 20 times the wall thickness of the tube and with the thickness after pressing being about equal to said wall or gauge thickness of the material, which may be about 0.004 inch.

In the arrangements described above, reference is made in general to welding tools for use in hand or power presses but obviously the invention may be applied to welding rollers for seaming purposes. Thus, an aluminum foil pack may be made up of two sheets of aluminum foil welded together around their edges by cooperating welding rollers which may each have a welding surface whose width is a substantial multiple of the thickness of the foil. The welding rollers may have chamfered welding surfaces as described in the co-pending patent application Serial No. 176,936, filed August 1, 1950, entitled Means for and Method of Cold Pressure Welding, thus for foils of 0.002" thickness, the welding surfaces may each have an angle of about 10° to the central plane of welding.

One other advantage of using a tool width which is a substantial multiple of the metal thickness is that the percentage reduction required for a satisfactory weld is reduced. Naturally, with a greater tool width, more metal is caused to flow, but, in certain circumstances such as in the case of collapsible tubes, this extra flow is accommodated by increasing the length of the tube.

In the foregoing, the width of the welding tool or rectangular pressure area has been described as being a multiple, at least about three or four times, of the gauge thickness of the material, the optimum value increasing as the gauge thickness decreases and being advantageously determined by test or experiment.

As pointed out herein, an essential characteristic of the cold pressure welding process according to the invention consists of a substantial upflow or hobbing action of the material around the edge of the tool, or flow of the metal both along and around the pressure area. The wider the tool in relation to the gauge thickness, the greater will be the upflow, until, in the extreme limit, the lateral flow becomes negligible and welding will occur substantially near the edges of the pressed area. This relation between upflow and lateral flow, in turn, depends upon the gauge thickness, in that the greater the gauge thickness the greater will be the lateral flow for a given tool width.

Expressed differently, a characteristic feature of the increased tool width as proposed by the invention consists in a variation of the metal flow at different points over the pressed area. More specifically, with the tool width being equal or of the order of the gauge thickness, as used according to previously known cold pressure welding techniques, the flow is about equal at the center and at the edges of the pressed area, i. e. a constant flow distribution exists over the entire welding area. This requires a substantial tool depression to produce a satisfactory weld as pointed out. As the tool width is increased in relation to the gauge thickness, it becomes more and more difficult for the metal to flow in the center, whereby to result in an increased relative flow at the edges both laterally and around the tool. As a result, a reduced tool depression will result in satisfactory welds. In the extreme case, with the tool width being a considerable multiple of the gauge thickness, metal flow and welding will be limited substantially to the areas near the edges of the pressed area.

In the case of welding thin sheets or foils of aluminum, average practical values for the tool width $w$ have been found to range from about $w=t$ to $w=10t$ for values of $t$ from 0.030 inch to 0.003 inch and from $w=10t$ to $w=100t$ for values of $t$ from 0.003 inch to 0.0003 inch, where $t$ represents the gauge thickness. For thicknesses greater than 0.030", the optimum tool width remains of the order of the gauge thickness, as described in the above-mentioned patent. Under these average conditions good welds both across and beyond the pressed area may be obtained.

In the case of ordinary indentation pressure welds using a tool width equal to or of the order of the gauge thickness, as described in the abovementioned U. S. patent, i. e. with the metal flow being substantially uniform over the pressed area and the weld joint being substantially limited to the area of the welding tool, the rate of the application of the pressure is substantially immaterial, equally good welds being obtainable by using either a slow squeeze or a pressure application in the form of a blow or impact. In the case of the present invention, on the other hand, where the resistance or reaction of the material plays an essential part in controlling the flow condition and formation of the final weld, as pointed out hereinabove, pressure by impact, such as by means of a center punch or equivalent impact device, greatly promotes the new effects herein described, especially in welding metal of relatively great hardness. Accordingly, the invention is advantageously carried out by using a pressure device operating by first storing a sufficient amount of energy and subsequently releasing the stored energy in the form of an impulse for actuating the pressure tool or tools.

In the foregoing, the invention has been described with reference to specific illustrative devices or methods. It will be apparent, however, that variations and modifications, as well as the substitution of equivalent elements and steps for those shown and described herein for illustration, may be made without departing from the broader scope and spirit of the invention as defined by the appended claims. The specification and drawing are accordingly to be regarded in an illustrative rather than in a limiting sense.

I claim:

1. A method of making a spot weld between a pair of metal foil members of cold pressure weldable material having a gauge thickness of less than about 0.030 inch comprising arranging said members with uncontaminated clean surfaces in overlapping contacting relation, supporting one of the members, applying without the use of external welding heat to a localized area of the other member having a minimum mean width of a substantial multiple of the gauge thickness a pressure, while leaving the members free to move transversely outside said area, to indent said members sufficiently to effect an interfacial metal flow and to create a drawing of the metal of both said members at said area out of the plane thereof, said indentation and the dimension of said localized area being such as to reduce the metal at said area to a predetermined thickness, to thereby create such interfacial metal flow as to extend the same to adjacent regions beyond said area so as to distort said members in a direction at right angle to the plane thereof, thereby to join said members by a solid phase welding bond.

2. A method of making a spot weld between a pair of metal foil members of cold pressure weldable material having a gauge thickness of less than about 0.030 inch comprising arranging said members with uncontaminated clean surfaces in overlapping contacting relation, supporting one of the members, applying without the use of external welding heat to a localized strip-like area of the other member having a minimum width of a substantial multiple of the gauge thickness a pressure, while leaving the members free to move transversely outside said area, to indent said members sufficiently to effect an interfacial metal flow and to create a drawing of the metal of both said members at said area out of the plane thereof, said indentation and the dimension of said localized area being such as to reduce the metal at said area to a predetermined thickness, to thereby create such interfacial metal flow as to extend the same to adjacent regions beyond said area so as to distort said members in a direction at right angle to the plane thereof, thereby to join said members by a solid phase welding bond.

References Cited in the file of this patent

UNITED STATES PATENTS 2,522,408  Sowter _____ Sept. 12, 1950